United States Patent [19]

Schaltenbrand

[11] 4,157,901

[45] Jun. 12, 1979

[54] FILTER BAG ASSEMBLY INCLUDING A VENTURI-CAGE ASSEMBLY

[75] Inventor: Eugene D. Schaltenbrand, Wellsville, N.Y.

[73] Assignee: The Air Preheater Company, Inc., Wellsville, N.Y.

[21] Appl. No.: 894,293

[22] Filed: Apr. 7, 1978

[51] Int. Cl.² ............................................ B01D 46/04
[52] U.S. Cl. ..................................... 55/302; 55/379
[58] Field of Search ............... 55/302, 368, 374, 375, 55/378, 379, 507, DIG. 26; 210/333 R, 411

[56] References Cited

U.S. PATENT DOCUMENTS

| | | | |
|---|---|---|---|
| 3,594,992 | 7/1971 | Carr | 55/368 |
| 3,680,285 | 8/1972 | Wellan et al. | 55/379 |
| 3,747,307 | 7/1973 | Peshina et al. | 55/379 |
| 3,830,043 | 8/1974 | Nielsen et al. | 55/378 |
| 3,874,857 | 4/1975 | Hunt et al. | 55/302 |
| 3,884,657 | 5/1975 | Rebours et al. | 55/374 |
| 3,893,833 | 7/1975 | Ulvestad | 55/302 |
| 3,997,305 | 12/1976 | Ulvestad et al. | 55/379 |
| 4,042,356 | 8/1977 | Miller | 55/507 |

*Primary Examiner*—David L. Lacey
*Attorney, Agent, or Firm*—Wayne H. Lang

[57] ABSTRACT

A skeletal support cage that supports a porous filter bag while it simultaneously provides an optimum spacing for a concentrically disposed aspirator that subjects the filter bag to a blast of cleaning air. The support cage is formed from a series of longitudinally extending spring members that include a "snap-in" detent locking the filter bag in an apertured tube sheet while also concentrically supporting a tubular aspirator within the filter bag to obtain optimum operation thereof.

1 Claim, 3 Drawing Figures

# FILTER BAG ASSEMBLY INCLUDING A VENTURI-CAGE ASSEMBLY

BACKGROUND OF THE INVENTION

The invention relates to bag filter apparatus that is adapted to receive gas carrying a quantity of dust or other particulate matter whereby the dust is deposited on the surface of the filter apparatus while the carrier gas is permitted to pass therethrough. A bag filter apparatus usually comprises an assembly of gas previous filter bags supported by an apertured tube sheet and mounted directly on the outer surface of cylindrical wire frames or "cages" of transverse circular bands and longitudinal rods. The bags are assembled on the cages by a system of clamps, bands and tightening screws that are laboriously assembled and independently adjusted until they provide a predetermined spacing together with optimum collecting and cleaning efficiency. When a filter bag is to be repaired or replaced, each filter bag must be first disassembled and then removed. After it has been replaced it is adjusted to provide optimum filter effectiveness and maximum efficiency for removal of the collected dust particles from the filter wall.

DESCRIPTION OF THE PRIOR ART

Various known art is directed to the particular manner of supporting a bag filter and the cleaning jet therefor, but all known arrangements are permanent or semi-permanent in nature whereby they resist rapid removal, repair and replacement.

U.S. Pat. No. 3,541,764 of Astrom granted Nov. 24, 1970, shows a support including a cap having an opening therein that directs a blast of cleaning air into each filter bag. Each cap positively centers the opening for optimum cleaning, but take-down requires the independent disassembly of a number of thumb screws, so the process is slow and costly.

U.S. Pat. No. 3,798,878 of Pausch granted Mar. 26, 1974, shows a collector-diffuser for each bag filter that is bolted to a tube sheet whereby disassembly requires manual removal of several bolts. There is no inner support for the filter bag.

U.S. Pat. No. 3,680,285 shows an arrangement whereby a flow nozzle is supported from a discharge nozzle which extends therein. The outer bag support cage depends from an independent collar which is secured to the tube sheet. Removal of the flow nozzle and the bag support cage remains a time consuming operation having two steps that must be effected separately and sequentially whenever the bag filter is to be repaired or replaced.

SUMMARY OF THE INVENTION

This invention therefore has as its principal objective the provision of a support cage for a bag filter that maintains a predetermined optimum spacing between a tubular bag filter and a concentrically disposed tubular jet aspirator. The invention discloses a support cage that provides a maximum amount of rigid support for a bag filter while it also concentrically holds a jet aspirator firmly inside. The support cage and holder for the jet aspirator are formed from a series of longitudinally extending stringers that are bent to include a spring biased detent that is adapted to lock itself in an apertured tube sheet. The detent action of the cage is readily overcome by a single unidirectional thrust that facilitates replacement and repair.

DESCRIPTION OF THE PREFERRED EMBODIMENT

Figure 1:
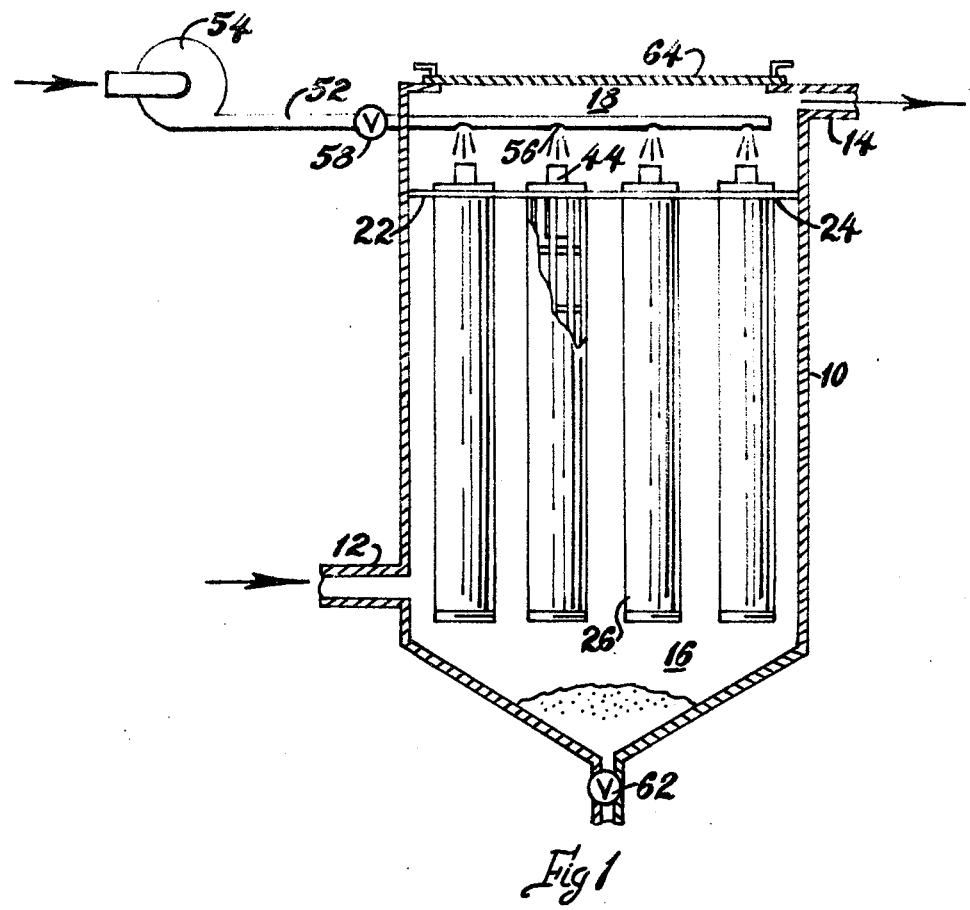
FIG. 1 shows a side elevation of a filter housing including a series of filter bags constructed in accordance with the invention.
Figure 2:
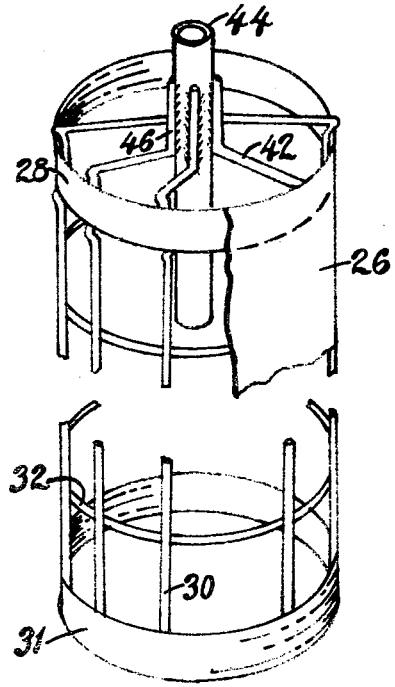
FIG. 2 is an enlarged perspective drawing that shows a single "snap-in" support cage for a filter bag.

The apparatus according to this invention comprises a housing 10 having an inlet 12 for dust bearing gas and an outlet 14 for the exhaust of clean gas therefrom. The housing is divided into inlet and outlet compartments 16 and 18 by a tube sheet 22 having a series of apertures 24 therein.

Into each aperture of the tube sheet is fitted a porous filter bag 26 having a lower closed end that lies in inlet chamber 16 and an open end thereof that confronts an opening of the tube sheet 22. A flexible support ring 28 is fastened to the open end of each filter bag by a process of looping the material or by sewing whereby the ring 28 snugly fits within its respective aperture of the tube sheet to press the fabric filter bag against the periphery of the aperture in the tube sheet when the ring is fully extended to its maximum annular position.

When it is relatively clean a porous filter bag 26 will provide little resistance to gas flowing therethrough. After long and continuous operation in a dirty gas environment, however, the walls of a filter will accumulate a thick deposit of particulate material thereby increasing its resistance to flow, thus causing the bag to deflate and lose its collecting efficiency.

Accordingly, each filter bag 26 is provided with a skeletal support cage comprised of longitudinal wires having transverse rings 32 that support it against a differential of pressure that may be imposed on opposite sides of the porous filter bag.

The longitudinal wires 30 of the support cage are welded to transverse rings 32 that encircle the cage, and to the rim of a pan 31 that forms the bottom of the cage. There is no transverse ring 32 at the upper end of each cage to permit the upper end of each wire 30 to maintain its radial resiliency whereby it may form a detent that interlocks with the ring 28.

To provide a detent that cooperates with the resilient upper end of each wire 30, the upper end of each wire 30 is formed with first and second radial projections 34 and 36.

Figure 3:
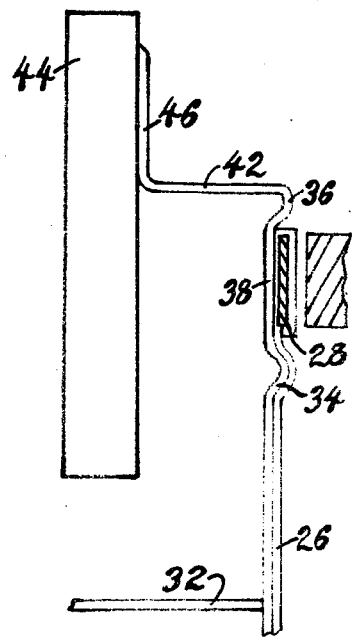
FIG. 3 is an enlarged side elevation of a single longitudinal cage member having a bent portion forming a detent.

The projections 34 and 36 are spaced apart a distance that forms a saddle 38 therebetween on which the ring 28 will effectively ride to thereby hold the filter bag in its respective opening in the manner shown by FIG. 3. The projections 34 and 36 are similar in that they are both simple lateral bends in the longitudinal wires 30.

The projection 34 lies spaced from the closest transverse ring 32 whereby it may be depressed laterally to pass by the ring 28, when the ring 28 interferes with the projection 34.

By contrast, the first projection 36 comprises a rigid "stop" member past which the ring 28 cannot move. This is true because the longitudinal wires 30 include a radial component 42 that extends inwardly from projection 36 to the aspirator tube 44 and is relatively nonflexible. Upon reaching the tube 44 each radial support rod 42 is bent 90° to form an axially extending rib 46 that lies along the outer periphery of tube 44, and along with other supports 42 forms a holder for the tube 44. The ribs 46 are eventually welded to the sides of the tube 44 to provide an integral support therefor.

Disposed within the clean air plenum chamber 18 and lying directly above each row of bags 26 is a compressed air line 52. The compressed air line 52 has a given source of air 54 that is controlled manually or automatically by a valve 58 whereby cleaning air may flow from the source to the line 52 and out discharge openings 56. An opening 56 is aligned with an aspirator 44 of each filter bag assembly, although they are not necessarily concentric one with the other, since any misalignment therebetween would be compensated for by the perfect concentricity of the aspirator 44 within the bag 26.

As cleaning the several bags is required, valve 58 is opened and a blast of compressed air from source 54 is allowed to discharge from openings 56 and enter aspirator 44. The discharge of compressed air through aspirator 44 causes an increased flow of air into aligned bags 26 around the aspirator 44 so there is a sudden expansion of the bags, and deposits of particulate matter are broken away therefrom in accordance with standard procedure.

Upon actuation of the jet of cleaning air, the collected particulate matter is free to fall from the surface of the filter bags 26 to the bottom of the housing 10 where a collection of particulate matter may be removed through a conventional valving device 62.

The housing 10 is provided with a removable cover 64, the removal of which provides access to the interior of housing 10. Thus when a particular bag 26 or series of bags becomes worn, torn, or otherwise in need of replacement or repair, the cover 64 may be removed. A simple "pull" on the bag to be replaced will unlock it from its detent in the apertured tube sheet, whereupon it may be completely removed from the housing 10 and replaced by a similar unit.

I claim:

1. Apparatus for filtering entrained particulate matter from a gas stream including a housing having an inlet for dust bearing gas and an outlet for clean gas, an apertured tube sheet intermediate said inlet and outlet defining inlet and outlet compartments, a series of porous filter bags depending from said tube sheet, each of said filter bags having a closed end thereof extending into the inlet compartment and an open end thereof extending through an aperture of said tube sheet, a support ring attached to the open end of each of said filter bags, and being concentric with respect to an aperture of said tube sheet, a source of pressurized cleaning fluid, nozzle means exhausting the cleaning fluid into the open end of each filter bag, a support cage in each filter bag comprising a longitudinal tubular framework of spaced resilient members, a tubular aspirator intermediate the nozzle means and each of said filter bags, and positioned to receive the cleaning fluid exhausting from said nozzle means, a plurality of supports contiguous with the resilient members of said frame and extending radially inward therefrom to radially abut said aspirator to support said tubular aspirator concentrically within each of said filter bags so as to maintain maximum flow from said nozzle means to effect maximum removal of dust particles from the walls of the filter bags, and an end of each longitudinal member including first and second radial projections that are spaced apart to form a saddle that holds the flexible support ring therebetween.

* * * * *